(12) United States Patent
Seif et al.

(10) Patent No.: US 12,189,587 B2
(45) Date of Patent: Jan. 7, 2025

(54) DEDUPLICATION OF VERSIONS OF A DATA OBJECT USING A RESOURCE PROXY

(71) Applicant: RED HAT, INC., Raleigh, NC (US)

(72) Inventors: Simon Seif, Freiburg im Breisgau (DE); Frank Alexander Zdarsky, Karlsruhe (DE)

(73) Assignee: Red Hat, Inc., Raleigh, NC (US)

( * ) Notice: Subject to any disclaimer, the term of this patent is extended or adjusted under 35 U.S.C. 154(b) by 66 days.

(21) Appl. No.: 18/150,288

(22) Filed: Jan. 5, 2023

(65) Prior Publication Data

US 2024/0232152 A1    Jul. 11, 2024

(51) Int. Cl.
*G06F 16/215* (2019.01)
*G06F 16/21* (2019.01)

(52) U.S. Cl.
CPC .......... *G06F 16/215* (2019.01); *G06F 16/219* (2019.01)

(58) Field of Classification Search
CPC .............................. G06F 16/215; G06F 16/219
See application file for complete search history.

(56) References Cited

U.S. PATENT DOCUMENTS

| | | | |
|---|---|---|---|
| 11,314,687 | B2 | 4/2022 | Anantharamakrishnan et al. |
| 2020/0159712 | A1* | 5/2020 | Nelson ................ G06F 16/2272 |
| 2021/0224093 | A1* | 7/2021 | Fu ......................... G06F 9/5072 |
| 2021/0382913 | A1 | 12/2021 | Natanzon et al. |
| 2021/0389883 | A1 | 12/2021 | Derryberry et al. |
| 2022/0019372 | A1* | 1/2022 | Vastrad ................... G06F 3/067 |
| 2022/0066669 | A1 | 3/2022 | Naik et al. |
| 2022/0100618 | A1 | 3/2022 | Jain et al. |

OTHER PUBLICATIONS

Hamandawana et al., "CROCUS: Enabling Computing Resource Orchestration for Inline Cluster-Wide Deduplication on Scalable Storage Systems," IEEE Transactions on Parallel and Distributed Systems, vol. 31(8), Aug. 2020: pp. 1740-1753, <https://ieeexplore.ieee.org/abstract/document/8993857>.

Zhao et al., "DupHunter: Flexible High-Performance Deduplication for Docker Registries," Proceedings of the 2020 USENIX Annual Technical Conference, Jul. 15-17, 2020: pp. 769-783, <https://www.usenix.org/system/files/atc20-zhao.pdf>.

* cited by examiner

*Primary Examiner* — Mark D Featherstone
*Assistant Examiner* — Kweku William Halm
(74) *Attorney, Agent, or Firm* — Kilpatrick Townsend & Stockton LLP (57) ABSTRACT

Deduplication of specifications for data objects can be performed. For example, the resource proxy can intercept a first write request from a client device. The first write request can be for a first data object that represents a first computing entity, and can include a first status. The resource proxy can generate a specification that can be used with the first status to create the first data object. After generating the specification, the resource proxy can intercept a second write request for a second data object with a second status. The second data object can represent a second computing entity that is a same type as the first computing entity. The specification can be used with the second status to create the second data object. The resource proxy can fulfill the second write request by creating the second version of the data object using the specification and the second status.

20 Claims, 4 Drawing Sheets

DEDUPLICATION OF VERSIONS OF A DATA OBJECT USING A RESOURCE PROXY

TECHNICAL FIELD

The present disclosure relates generally to deduplication of data on a computer system. More specifically, but not by way of limitation, this disclosure relates to deduplication of versions of a data object using a resource proxy.

BACKGROUND

Data deduplication is a process in which duplicate copies of data stored in a storage device are removed to allow more data to be stored in the storage device. Deduplication typically involves comparing storage blocks to one another to identify a match. A storage block can be a memory block that may correspond to a memory page, multiple memory pages, or a portion of a memory page. When a match between two or more storage blocks occurs, one of the storage blocks is retained on the storage device and the redundant storage blocks are replaced with a small reference that points to the maintained storage block. This process can free up storage space by significantly reducing the amount of data that is stored in the storage device. Since the same data may be stored hundreds or thousands of times in the storage device, deduplicating the data can greatly increase the amount of available storage space and improve the utilization of storage resources.

DETAILED DESCRIPTION

Computer systems often include orchestration systems to manage data stored in a database or another suitable storage device in the computer systems. An orchestration system can automate configuration, scaling, or coordination of a resource (e.g., a data object) to enable the computer systems to perform relatively complex workflows. The data object can be a representation of a real world entity such as computing devices, virtual machines, databases, or containers. The data object can include a desired state describing predetermined characteristics of the entity and an actual state describing characteristics of the entity at a point in time. In some examples, the orchestration system (e.g., Kubernetes) may manage multiple entities of the same type. In a Kubernetes system, the desired state can be referred to as a specification, while the actual state can be referred to as a status. The entities may be substantially similar or identical, and each entity may have an associated data object. But, the specification may be identical for each data object, causing relatively inefficient consumption of storage resources. For example, if a computer system includes edge clusters, the specification may be heavily duplicated (e.g., duplicated millions of times). In such examples, the orchestration system may lack sufficient computing resources, such as storage capacity, to manage storage or duplication of the data objects, thereby limiting scalability of the data processing system.

Some examples of the present disclosure can overcome one or more of the abovementioned problems by using a resource proxy to perform deduplication for versions of a data object. The resource proxy can be a software component that intercepts requests (e.g., a read request or a write request) from a client device for a data object in a computing environment. In response to intercepting a write request for a new data object, the resource proxy can perform deduplication to create the new data object. Deduplication can include comparing a required specification for the new data object to an existing specification for an existing data object stored in the database. If the existing specification in the database can be used in creating the new data object, the resource proxy may not store a redundant copy of the specification to create the new data object. Instead, when writing the new data object to the database, the resource proxy may store a reference to the specification already stored in the database. As a result, an amount of data stored in the database can be significantly reduced. This can improve storage utilization such that computing resources associated with storage capacity can be allocated relatively efficiently. Reusing the specification can reduce the overall storage requirement by (n−1)*(specification size), where n is the number of duplicated data objects. Thus, the reduction in storage from storing the reference can be represented as (n−1)*(specification size)−(reference size), noting that the reference size is significantly smaller than the specification size. For edge clusters, n can be a relatively large number (e.g., in the millions). The resulting reduction in storage can allow for significant improvements in scalability.

In one particular example, a Kubernetes environment can include the resource proxy that can intercept a write request from a client device for a new data object representing a virtual machine. The Kubernetes environment can include a database that stores an existing data object representing an existing virtual machine that is identical to the requested virtual machine. The data object can include a specification containing essential components for a virtual machine. The write request for the virtual machine can include a status that can be used with a specification to create the new data object for the virtual machine. The resource proxy can identify that the specification of the existing data object can be used with the status in the write request to create the new data object. Instead of duplicating the specification, the resource proxy can fulfill the write request by using a reference to the specification of the existing data object to create the new data object.

In some examples, the resource proxy may intercept a read request for the new data object for the new virtual machine from the client device. The read request may include an identifier that the resource proxy can use to locate the entry for the new data object in the database. After locating the entry, the resource proxy can use the status of the new data object and the reference to the specification of the existing data object to fulfill the read request. The resource proxy then can merge the status with the specification of the existing data object to materialize the new data object for the new virtual machine for the read request. After materializing the data object, the resource proxy can return the new data object for the virtual machine to the client device to fulfill the read request.

In some examples, the specification of the existing data object that is stored in the database can be modified to generate a modified specification used to create a different data object. For example, the resource proxy can intercept a write request to create another data object for another virtual machine using a specification that differs from the existing specification in the database. If there is a relatively small difference between the requested specification and the existing specification, the resource proxy can determine a modification to the existing specification that could be used to create the requested specification. Rather than generating and storing a modified specification using the modification, the resource proxy can store a reference to the specification of the existing data object in a database entry of the database. Additionally, the resource proxy can store instructions for applying the modification to the specification in the database entry for the requested data object for the virtual machine. When a subsequent read request for the new data object for the virtual machine is received, the resource proxy can access the specification via the reference in the entry. The resource proxy can then materialize the new data object by first performing a modification to the specification to generate the modified specification. The modified specification can then be combined with the status to materialize the new data object for the virtual machine.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
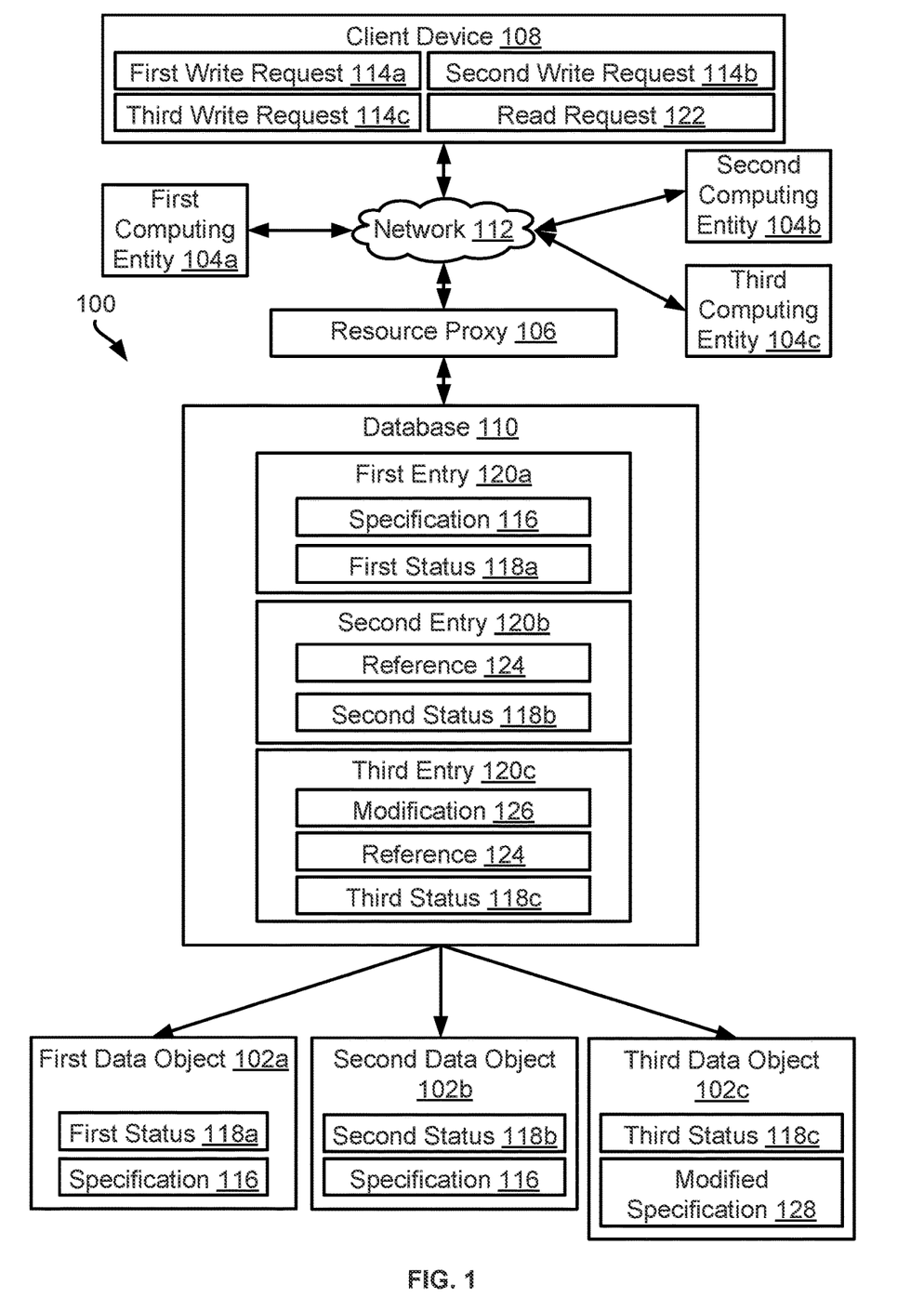
FIG. 1 is a block diagram of an example of a computing environment for performing deduplication for one or more data objects for computing entities using a resource proxy according to some aspects of the present disclosure.

FIG. 1 is a block diagram of an example of a computing environment 100 for performing deduplication for one or more data objects 102a-c for computing entities 104 using a resource proxy 106 according to some aspects of the present disclosure. A client device 108 can be communicatively coupled to the resource proxy 106 via a network 112, such as a local area network (LAN), wide area network (WAN), the Internet, or any combination thereof. Examples of the client device 108 can include a laptop computer, desktop computer, server, tablet, e-reader, a mobile phone, or a wearable device such as a smart watch. Examples of the computing entities 104 can include containers, computing systems, nodes, applications, pods, services, or replication controllers. The resource proxy 106 can be communicatively coupled to a database 110 for the computing entities 104, enabling the resource proxy to receive and fulfill requests from the client device 108. Each computing entity 104 can be represented by a data object 102 that can comprise a specification 116 (e.g., desired state) and a status 118 (e.g., actual state). The computing environment 100 may be managed by a management orchestration system such as Kubernetes that may follow a strict conceptual separation of desired state and actual state for data objects 102a-c representing the computing entities 104. For example, the management orchestration system may separate storage for a desired state for a data object 102 from an actual state of the data object 102. Each computing entity 104 may be of the same type, such as a virtual machine or container. In some examples, each of the computing entities 104 may be similar or substantially identical. Therefore, each data object 102 may require the same or similar specification 116 stored in the database 110. The status 118 for each data object 102 may differ.

The client device 108 may transmit write requests 114a-c for data objects 102a-c representing the computing entities 104 to the computing environment 100. The data object 102 can be fronted with a resource proxy 106, which can intercept the write requests 114a-c. For example, the resource proxy 106 can be an interface positioned in front of an application programming interface (API) to intercept API calls transmitted from the client device 108. Each data object 102 can be created by the resource proxy 106 by merging a specification 116 and a status 118. For example, a first status 118a can include information associated with operations (e.g., allocations) executed on the specification 116, such as changes to configuration settings in the specification 116. The specification 116 can include configuration settings and other default values for the data object 102.

In response to intercepting the write requests 114a-c, the resource proxy may perform a deduplication process instead of duplicating the specification 116 when creating the data objects 102a-c. This can prevent unnecessary data storage by reusing an existing specification 116 stored in the database 110. The write requests 114a-c can outline the status 118a-c in the data objects 102a-c. The resource proxy 106 can determine whether the existing specification 116 can be reused based on the write request 114a-c.

For example, the client device 108 can transmit a first write request 114a for a first data object 102a representing a first computing entity 104a, such as a container. The first write request 114a can indicate a required specification 116 and a first status 118a corresponding to the first data object 102a. The first status 118a can be combined with the specification 116 to create the first data object 102a, for example to fulfill the first write request 114a. The resource proxy 106 can generate or retrieve the specification 116. The first data object 102a can be created by storing a first entry 120a in the database 110 that includes the specification 116 and the first status 118a.

Similarly, a second write request 114b can be received that includes a second status 118b and a corresponding specification to create a second data object 102b representing a second computing entity 104b. The second computing entity 104b may also be a container. Thus, the corresponding specification in the second data object 102b may match the specification 116 in the first data object 102a stored in the database 110, enabling the specification 116 to be reused. Instead of storing redundant data (e.g., the corresponding specification), the resource proxy 106 can store a reference 124 to the specification 116, for example in a second entry 120b of the database 110. Thus, the resource proxy 106 or another suitable computing component in the computing environment 100 can use the reference 124 to locate the specification 116. For example, the resource proxy 106 may update a page table so that the reference 124 points to the specification 116 in the database 110, enabling the resource proxy to find the specification 116 in the database 110 using the reference 124. The reference 124 can be relatively less storage-intensive compared to the required specification in the second write request 114b, thereby decreasing an amount of stored data in the database 110.

The client device 108 may also transmit a read request 122 to the database 110 to read from a specific data object 102. For example, the client device 108 may transmit the read request 122 for the second data object 102b representing the second computing entity 104b. The resource proxy 106 can intercept the read request 122 and fulfill the read request 122 by returning the second data object 102b to the client device 108. To fulfill the read request 122, the resource proxy 106 can query the database 110 using a unique identifier included in the read request 122. The unique identifier can be associated with a specific entry in the database 110 that corresponds to the second data object 102b. For example, the unique identifier can match with metadata stored in the second entry 120b that includes the second status 118b used to create the second data object 102b.

After locating the specific entry (e.g., the second entry 120b) for the second data object 102b, the resource proxy 106 can generate the second data object 102b using the second status 118b and the specification 116. For example, if the second entry 120b contains the second status 118b and the specification 116, the resource proxy 106 can merge the second status 118b and the specification 116 to materialize the second data object 102b. Alternatively, if the second entry 120b contains the second status 118b and a reference 124 to the specification 116, the resource proxy 106 can use the reference 124 to the specification 116 to query the database 110 to locate the specification 116. For example, the resource proxy 106 can locate the specification 116 using a reference 124 to the specification 116 stored in the first entry 120a. After locating the specification 116, the resource proxy 106 can merge the second status 118b with the specification 116 to materialize the second data object 102b. The resource proxy 106 then can return the second data object 102b to the client device 108 to fulfill the read request 122.

In some examples, another specification included in an intercepted request may differ slightly from the specification 116 stored in the database 110. In such examples, instead of storing the other specification in the intercepted request, the specification 116 can be used to fulfill the intercepted request. The resource proxy 106 can determine a modification 126 to the specification 116 to generate a modified specification 128 that matches the other specification in the intercepted request. The modified specification 128 can be used to create another data object 102 to fulfill the intercepted request. The modification 126 can be stored in the database 110 or another suitable storage device. For example, the resource proxy 106 can intercept a third write request 114c for a third data object 102c representing a third computing entity 104c. The third computing entity 104c may also be a container, like the first computing entity 104a and the second computing entity 104b. But, the third computing entity 104c may differ slightly. For example, the third computing entity 104c may require an additional feature not present in the first computing entity 104a or the second computing entity 104b. Thus, the specification 116 in the third data object 102c representing the third computing entity 104c may require an additional feature (e.g., the modification 126). The third entry 120c can therefore include a third status 118c requested in the third write request 114c, a reference 124 to the specification 116 in the first entry 120a, and the modification 126 to the specification 116.

The resource proxy 106 can determine that the third data object 102c is created using the modified specification 128 by comparing the specification 116 in the third write request 114c to the specification 116 in the database 110. If the resource proxy 106 can determine the modification 126 to the specification 116 in the database to generate the specification 116 in the third write request 114c, the resource proxy 106 can store the modification 126 in the third entry 120c with a reference 124 to the specification 116 in the database 110. Additionally, or alternatively, the resource proxy 106 can access (e.g., in the database 110) at least one rule to specify how the specification 116 differs between different data objects 102. For example, a user can generate the rule based on a caching algorithm associated with the different data objects 102. A combination of the modification 126 and the third reference 124c may be less storage-intensive than the specification 116 in the third write request 114c, enabling decreased storage consumption by the database 110.

For simplicity, some of the above examples involve performing deduplication with respect to three data objects 102a-c representing computing entities 104a-c at a time. But, the concepts described herein are not intended to be limited to performing deduplication with respect to only three data objects 102a-c at a time. The resource proxy 106 can perform the above process for any number of data objects 102a-c representing computing entities 104a-c.

Figure 2:
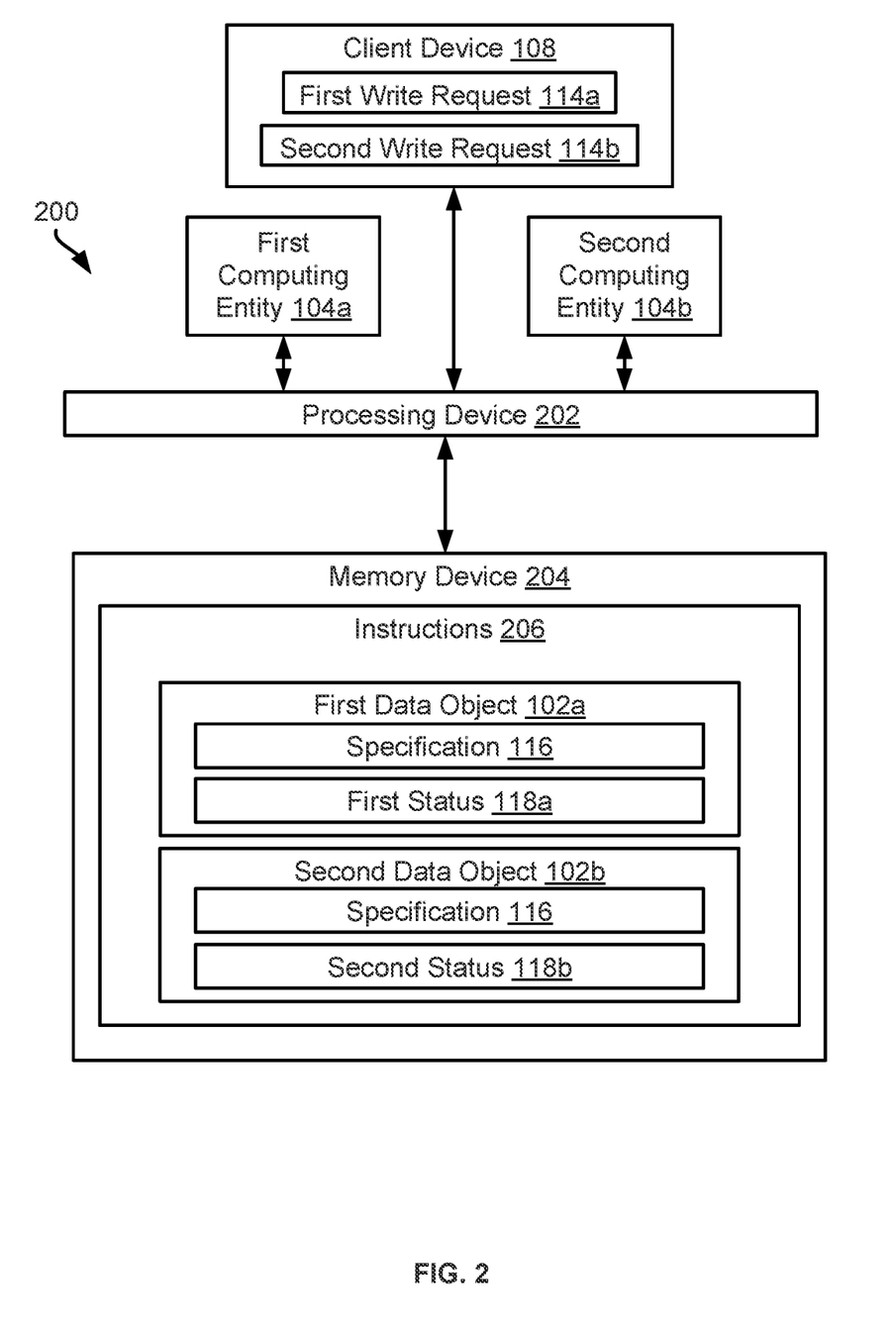
FIG. 2 is a block diagram of another example of a computing environment for performing deduplication for data objects representing computing entities according to some aspects of the present disclosure.

FIG. 2 is a block diagram of another example of a computing environment 200 for performing deduplication for data objects 102a-b representing computing entities 104a-b according to some aspects of the present disclosure. The computing environment 200 can include a processing device 202 communicatively coupled to a memory device 204. In some examples, a client device 108 can be communicatively coupled to the computing environment 200, for example via a network (e.g., the network 112 of FIG. 1).

The processing device 202 can include one processing device or multiple processing devices. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processing device, and optical storage.

In some examples, the processing device 202 can execute the instructions 206 to perform operations. For example, the processing device 202 can intercept a first write request 114a from the client device 108. The first write request 114a can be associated with a first data object 102a representing a first computing entity 104a that has a first status 118a. The processing device 202 can identify or generate a specification 116 that can be combined with the first status 118a to create the first data object 102a. After creating the first data object 102a, the processing device 202 can intercept a second write request 114b for a second data object 102b representing a second computing entity 104b that is a same type of computing entity as the first computing entity 104a. The second write request 114b can include a second status 118b that is different from the first status 118a. Thus, the processing device 202 may store both the first status 118a and the second status 118b in the database 110. The processing device 202 may determine that the specification 116 can be used with the second status 118b to create the second data object 102b. In response, the processing device 202 can fulfill the second write request 114b by creating the second data object 102b using the specification 116 and the second status 118b.

Figure 3:
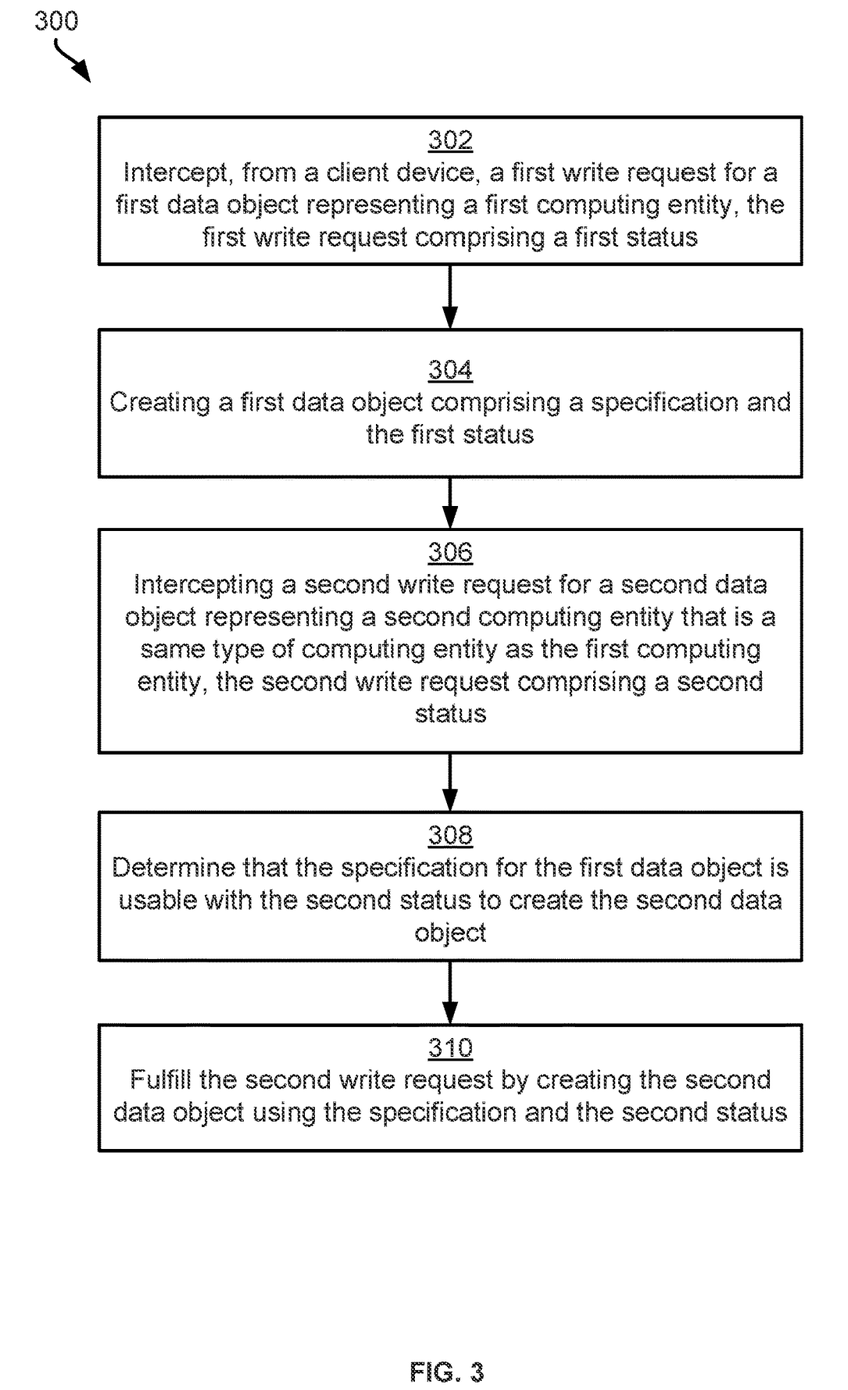
FIG. 3 is a flowchart of a process involving deduplicating data objects representing computing entities according to some aspects of the present disclosure.
Figure 4:
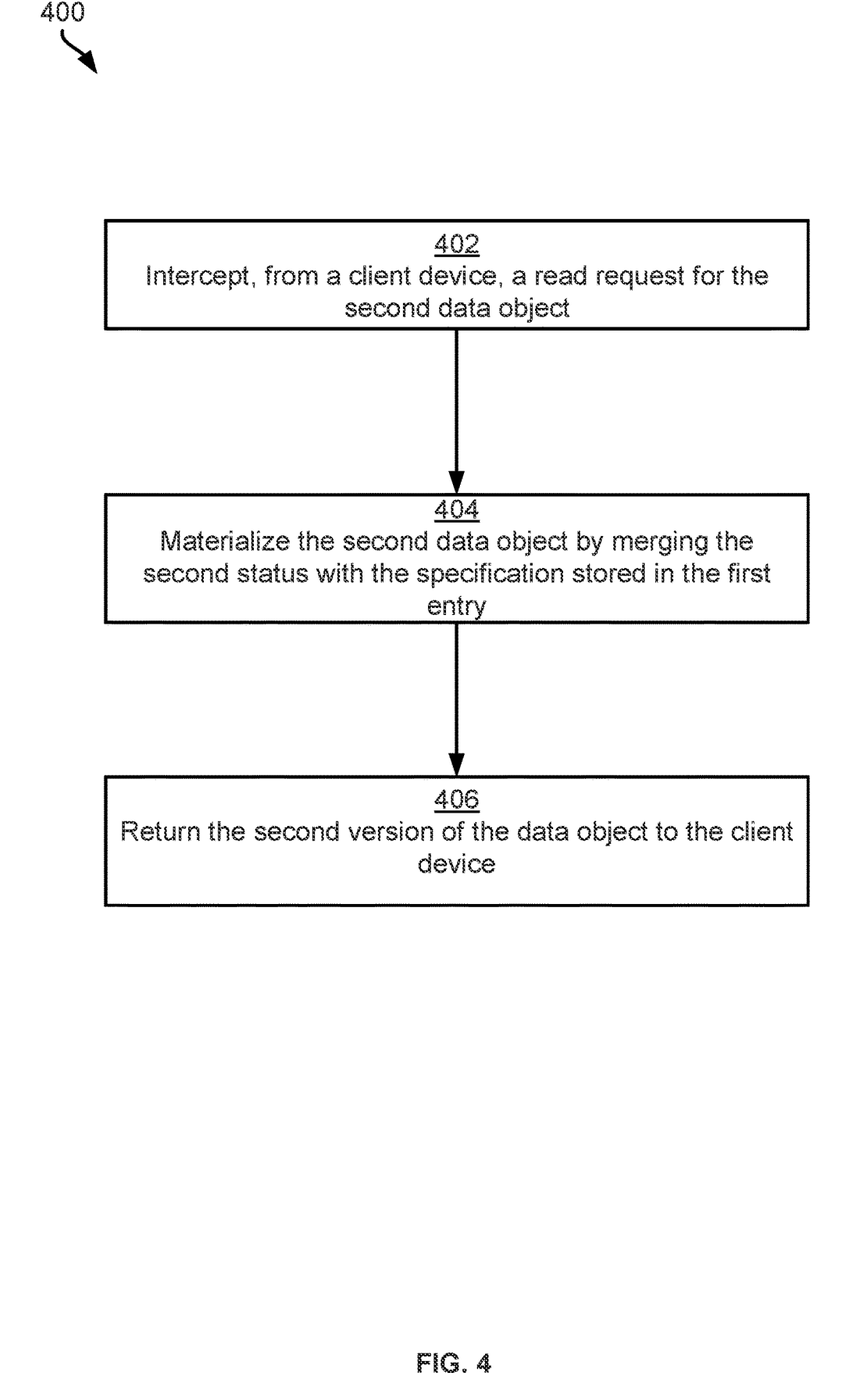
FIG. 4 is a flowchart of a process involving materializing data objects according to some aspects of the present disclosure.

FIG. 3 is a flowchart of a process involving deduplicating data objects 102 representing computing entities 104 according to some aspects of the present disclosure. In some examples, a processing device 202 in a computing environment 200 can perform one or more of the steps shown in FIGS. 3-4. In other examples, the processing device 202 can implement more steps, fewer steps, different steps, or a different order of the steps depicted in FIGS. 3-4. The steps of FIGS. 3-4 are described below with reference to components discussed above in FIGS. 1 and 2.

Turning now to FIG. 3, in block 302, a processing device 202 intercepts, from a client device 108, a first write request 114a for a first data object 102a representing a first computing entity 104a, the first write request 114a comprising a first status 118a. The client device 108 can issue the first write request 114a in response to a command from an entity (e.g., a user, developer, client, etc.) associated with the client device 108. For example, a user may generate the command to create a deployment object to represent a software application running in a computing cluster. The processing device 202 can store the specification 116 in a database 110 for stable storage.

In block 304, the processing device 202 creates a first data object 102a that includes a specification 116 and the first status 118a. In some examples, the first status 118a or the specification 116 can include information identifying a data type of the data object 102 or computing entity 104. In such examples, the processing device 202 can be customized to intercept communication from the client device 108 that is associated with a predetermined data type of the data object 102 or computing entity 104. For example, the processing device 202 may selectively intercept API calls associated with containers.

The processing device 202 may generate the specification 116 based on the type of data object, or may identify an existing specification. For example, the processing device 202 can compare the specification 116 in the first write request 114a to the specification 116 in the database 110 to determine whether a match exists. If the specification 116 in the first write request 114a matches the specification 116 in the database 110, the processing device 202 can store the specification 116 in the database 110 in a first entry 120a in the database 110. Additionally, the processing device 202 can store the first status 118a in the first entry 120a of the database 110 to create the first data object 102a.

In block 306, subsequent to creating the first data object 102a, the processing device 202 intercepts a second write request 114b for a second data object 102b representing a second computing entity 104b that is a same type of computing entity as the first computing entity 104a, the second write request 114b having a second status 118b. The processing device 202 can intercept the second write request 114b from the client device 108. Because the computing entities 104a-b are of the same type, their respective data objects 102a-b may have the same specifications 116.

In block 308, the processing device 202 determines that the specification 116 for the first data object 102a can be used with the second status 118b to create the second data object 102b. In response, the processing device 202 can generate a reference 124 to the specification 116 in the first entry 120a that can be used to identify the specification 116. For example, the second reference 124b can be a field in a database index associated with the database 110. In block 310, the processing device 202 fulfills the second write request 114b by creating the second data object 102b using the specification 116 and the second status 118b. To create the second data object 102b, the processing device 202 can store the second status 118b and the reference 124 to the specification 116 in a second entry 120b of the database 110. If the processing device 202 intercepts a read request 122 from the client device 108, the processing device 202 can use the reference 124 in the database 110 to locate the specification 116 in the database 110. Further details about this process are described below with respect to FIG. 4.

Turning now to FIG. 4, in block 402, the processing device 202 intercepts, from a client device 108, a read request 122 for a second data object 102b representing a second computing entity 104b. In some examples, the read request 122 can include a unique identifier (e.g., metadata) that the processing device 202 can use to identify a corresponding entry in the database 110 that corresponds to the second data object 102b. For example, the processing device 202 can use a primary key in the database 110 as the unique identifier to determine that the second status 118b used to materialize the second data object 102b is stored in a second entry 120b of the database 110.

In block 404, the processing device 202 materializes the second data object 102b by merging a second status 118b with a specification 116. In some examples, the processing device 202 can access the specification 116 using a reference 124 in the second entry 120b to the specification 116 in the first entry 120a. In some examples, after locating the specification 116 in the first entry 120a, the processing device 202 may apply a modification 126 to the specification 116 prior to merging the second status 118b with the specification 116. For example, the modification 126 may involve adjusting certain fields in the specification 116 that differ between different computing entities 104 represented by the data objects 102. The processing device 202 can determine the modification 126 using one or more rules generated at least in part by a user. By implementing a modification process for the specification 116, the processing device 202 can reuse the specification 116 stored in the database 110 instead of storing multiple specifications, thereby reducing storage consumption of the database 110.

In block 406, the processing device 202 returns the second data object 102b representing the second computing entity 104b to the client device 108. In some examples, the second data object 102b can be returned to the client device 108 as a virtual resource. The processing device 202 can fulfill the read request 122 using the second status 118b and the second reference 124b to the specification 116, for example by merging the second status 118b and the specification 116 to materialize the second data object 102b. Although the process 400 is described with respect to returning the second data object 102b representing the second computing entity 104b, the processing device 202 can perform similar steps to return any data object 102.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A system comprising:
a processing device; and
a memory device including instructions that are executable by the processing device for causing the processing device to perform operations comprising:
intercepting, from a client device, a first write request for a first data object representing a first computing entity, the first write request comprising a first status;
creating the first data object comprising a specification and the first status;
subsequent to creating the first data object, intercepting a second write request for a second data object representing a second computing entity that is a same type of computing entity as the first computing entity, the second write request comprising a second status;
determining that the specification for the first data object is usable with the second status to create the second data object; and
in response to determining that the specification for the first data object is usable with the second status to create the second data object, fulfilling the second write request by creating the second data object using the specification of the first data object and the second status from the second write request.

2. The system of claim 1, wherein the operations further comprise:
creating the first data object by storing the first status and the specification in a first entry in a database; and
creating the second data object by storing, in a second entry in the database, the second status and a reference to the specification in the first entry.

3. The system of claim 2, wherein the operations further comprise, subsequent to creating the second data object:
intercepting, from the client device, a read request for the second data object; and
fulfilling the read request using the second status and the reference to the specification stored in the second entry.

4. The system of claim 3, wherein the operations further comprise fulfilling the read request by:
accessing the specification using the reference stored in the second entry;
in response to accessing the specification, materializing the second data object by merging the second status with the specification; and
returning the second data object to the client device.

5. The system of claim 2, wherein the operations further comprise:
intercepting, from the client device, a third write request for a third data object representing a third computing entity that is the same type of computing entity as the first computing entity, the third write request comprising a third status; and
in response to intercepting the third write request for the third data object, determining a modification to the specification in the first entry usable to create the third data object.

6. The system of claim 5, wherein the operations further comprise:
subsequent to determining the modification, creating the third data object by:
storing the third status in a third entry in the database;
storing a third reference to the specification in the third entry; and
storing the modification to the specification in the third entry.

7. The system of claim 6, wherein the operations further comprise:
intercepting, from the client device, a read request for the third data object;
in response to intercepting the read request for the third data object, generating a modified specification for the third data object by modifying the specification using the modification in the third entry; and
fulfilling the read request by generating the third data object using the modified specification and the third status.

8. A method comprising:
intercepting, from a client device, a first write request for a first data object representing a first computing entity, the first write request comprising a first status;
creating the first data object comprising a specification and the first status;
subsequent to creating the first data object, intercepting a second write request for a second data object representing a second computing entity that is a same type of computing entity as the first computing entity, the second write request comprising a second status;
determining that the specification for the first data object is usable with the second status to create the second data object; and
in response to determining that the specification for the first data object is usable with the second status to create the second data object, fulfilling the second write request by creating the second data object using the specification of the first data object and the second status from the second write request.

9. The method of claim 8, further comprising:
creating the first data object by storing the first status and the specification in a first entry in a database; and
creating the second data object by storing, in a second entry in the database, the second status and a reference to the specification in the first entry.

10. The method of claim 9, further comprising, subsequent to creating the second data object:
intercepting, from the client device, a read request for the second data object; and
fulfilling the read request using the second status and the reference to the specification stored in the second entry.

11. The method of claim 10, further comprising fulfilling the read request by:
accessing the specification using the reference stored in the second entry;
in response to accessing the specification, materializing the second data object by merging the second status with the specification; and
returning the second data object to the client device.

12. The method of claim 9, further comprising:
intercepting, from the client device, a third write request for a third data object representing a third computing entity that is the same type of computing entity as the first computing entity, the third write request comprising a third status; and
in response to intercepting the third write request for the third data object, determining a modification to the specification in the first entry usable to create the third data object.

13. The method of claim 12, further comprising:
subsequent to determining the modification, creating the third data object by:
storing the third status in a third entry in the database;

storing a third reference to the specification in the third entry; and storing the modification to the specification in the third entry.

14. The method of claim 13, further comprising:

intercepting, from the client device, a read request for the third data object;

in response to intercepting the read request for the third data object, generating a modified specification for the third data object by modifying the specification using the modification in the third entry; and fulfilling the read request by generating the third data object using the modified specification and the third status.

15. A non-transitory computer-readable medium comprising program code executable by a processing device for causing the processing device to perform operations comprising:

intercepting, from a client device, a first write request for a first data object representing a first computing entity, the first write request comprising a first status;

creating the first data object comprising a specification and the first status;

subsequent to creating the first data object, intercepting a second write request for a second data object representing a second computing entity that is a same type of computing entity as the first computing entity, the second write request comprising a second status;

determining that the specification for the first data object is usable with the second status to create the second data object; and in response to determining that the specification for the first data object is usable with the second status to create the second data object, fulfilling the second write request by creating the second data object using the specification of the first data object and the second status from the second write request.

16. The non-transitory computer-readable medium of claim 15, wherein the operations further comprise:

creating the first data object by storing the first status and the specification in a first entry in a database; and creating the second data object by storing, in a second entry in the database, the second status and a reference to the specification in the first entry.

17. The non-transitory computer-readable medium of claim 16, wherein the operations further comprise, subsequent to creating the second data object:

intercepting, from the client device, a read request for the second data object; and fulfilling the read request using the second status and the reference to the specification.

18. The non-transitory computer-readable medium of claim 17, wherein the operations further comprise fulfilling the read request by:

accessing the specification using the reference stored in the second entry;

in response to accessing the specification, materializing the second data object by merging the second status with the specification; and returning the second data object to the client device.

19. The non-transitory computer-readable medium of claim 16, wherein the operations further comprise:

intercepting, from the client device, a third write request for a third data object representing a third computing entity that is the same type of computing entity as the first computing entity, the third write request comprising a third status; and in response to intercepting the third write request for the third data object, determining a modification to the specification in the first entry usable to create the third data object.

20. The non-transitory computer-readable medium of claim 19, wherein the operations further comprise:

subsequent to determining the modification, creating the third data object by:

storing the third status in a third entry in the database;

storing a third reference to the specification in the third entry; and storing the modification to the specification in the third entry.

* * * * *